(12) United States Patent
Li et al.

(10) Patent No.: US 11,156,069 B2
(45) Date of Patent: Oct. 26, 2021

(54) SUPPORTED CATALYST-ASSISTED MICROWAVE METHOD FOR EXPLOITING HEAVY OIL RESERVOIR

(71) Applicant: China University of Petroleum (East China), Shandong (CN)

(72) Inventors: Zhaomin Li, Shandong (CN); Zhengxiao Xu, Shandong (CN); Teng Lu, Shandong (CN); Yanling Zhao, Shandong (CN); Yajie Xu, Shandong (CN); Fanyu Meng, Shandong (CN); Faqiang Dang, Shandong (CN)

(73) Assignee: China University of Petroleum (East China), Qingdao (CN)

( * ) Notice: Subject to any disclaimer, the term of this patent is extended or adjusted under 35 U.S.C. 154(b) by 12 days.

(21) Appl. No.: 16/745,061

(22) Filed: Jan. 16, 2020

(65) Prior Publication Data
US 2020/0378227 A1    Dec. 3, 2020

(30) Foreign Application Priority Data

Jun. 3, 2019    (CN) .......................... 201910476237.X

(51) Int. Cl.
*E21B 43/24* (2006.01)
*B01J 21/18* (2006.01)
(Continued)

(52) U.S. Cl.
CPC .......... *E21B 43/2401* (2013.01); *B01J 21/18* (2013.01); *B01J 23/745* (2013.01);
(Continued)

(58) Field of Classification Search
CPC ..... E21B 43/2401; E21B 43/20; C09K 8/592; C09K 2208/10
See application file for complete search history.

(56) References Cited

U.S. PATENT DOCUMENTS

| | | | |
|---|---|---|---|
| 2008/0217008 A1* | 9/2008 | Langdon | ............... E21B 43/168 166/270 |
| 2010/0012331 A1* | 1/2010 | Larter | ................... E21B 43/243 166/401 |

(Continued)

FOREIGN PATENT DOCUMENTS

| | | |
|---|---|---|
| CN | 102533216 A | 7/2012 |
| CN | 104531119 A | 4/2015 |

(Continued)

OTHER PUBLICATIONS

Ferry Iskandar et al., Fe3O4/Zeolite nanocomposites synthesized by microwave assisted coprecipitation and its performance in reducing viscosity of heavy oil. AIP Conference Proceeding, Feb. 17, 2015: 132-135.

*Primary Examiner* — Silvana C Runyan

(57) ABSTRACT

The invention relates to the recovery of heavy oil reservoirs, and more particularly to a supported catalyst-assisted microwave method for exploiting a heavy oil reservoir. The method includes: (1) injecting a slug of a supported catalyst fluid into the heavy oil reservoir; (2) placing a microwave generator in the heavy oil reservoir to perform volumetric heating on an oil layer containing the supported catalyst fluid; and (3) turning off the microwave generator and injecting water into the heavy oil reservoir for subsequent displacement, where a water injection rate is 3 m/d or less.

8 Claims, 4 Drawing Sheets

(51) Int. Cl.
*B01J 23/745* (2006.01)
*B01J 35/00* (2006.01)
*C09K 8/592* (2006.01)
*E21B 43/20* (2006.01)

(52) U.S. Cl.
CPC ....... *B01J 35/0013* (2013.01); *B01J 35/0033* (2013.01); *C09K 8/592* (2013.01); *E21B 43/20* (2013.01); *C09K 2208/10* (2013.01)

(56) References Cited

U.S. PATENT DOCUMENTS

| | | | |
|---|---|---|---|
| 2010/0089574 A1* | 4/2010 | Wheman | E21B 10/60 166/272.1 |
| 2010/0300682 A1* | 12/2010 | Thakur | E21B 43/00 166/250.01 |
| 2012/0234536 A1* | 9/2012 | Wheeler | E21B 43/2408 166/272.1 |
| 2016/0024374 A1* | 1/2016 | Sadana | C09K 8/592 166/272.6 |
| 2018/0073337 A1* | 3/2018 | Park | E21B 43/2401 |

FOREIGN PATENT DOCUMENTS

| | | |
|---|---|---|
| CN | 106089167 A | 11/2016 |
| CN | 106334522 A | 1/2017 |
| CN | 109424345 A | 3/2019 |

\* cited by examiner

SUPPORTED CATALYST-ASSISTED MICROWAVE METHOD FOR EXPLOITING HEAVY OIL RESERVOIR

CROSS-REFERENCE TO RELATED APPLICATIONS

This application claims the benefit of priority from Chinese Patent Application No. 201910476237.X, filed on Jun. 3, 2019. The content of the aforementioned application, including any intervening amendments thereto, is incorporated herein by reference.

TECHNICAL FIELD

This application relates to the recovery of viscous crude oil reservoirs, and more particularly to a supported catalyst-assisted microwave method for exploiting a viscous crude oil reservoir.

BACKGROUND OF THE INVENTION

Recently, microwave, due to the efficient, rapid and clean operation, has been widely applied to the recovery of unconventional reservoirs such as deep, thin and offshore oil sand, ultra-viscous crude oil and oil shale, where a high-power microwave source is used to radiate energy on an oil-bearing formation. Currently, how to accelerate the development and application of microwave recovery techniques has been extensively investigated. The heating efficiency of microwave greatly depends on a dielectric loss constant of the object. Water, activated carbon, transition metals and oxides thereof have strong absorption to microwave, while the viscous crude oil shows a weak absorption to microwave. Therefore, an additive is required to further improve the heating efficiency of microwave for the viscous crude oil. It has been preliminarily confirmed through some exploratory researches that the nanocatalyst-assisted microwave recovery has great advantages in improving the recovery ratio for unconventional reservoirs such as viscous crude oil. Considering the actual development of oil and gas resources in the world, the nanocatalyst-assisted microwave has extremely broad application prospects in the development of unconventional reservoirs.

Recently, in-depth researches have been conducted on the effect of the nanocatalyst-assisted microwave heating on viscosity reduction of the viscous crude oil. The temperature increase locally occurring on the surface of the catalyst due to the microwave irradiation leads to the enhancement in the catalytic activity, accelerating the cracking and viscosity-reducing reaction of the viscous crude oil. However, there is a great difficulty in applying the nano-catalytic system to the cracking and viscosity reduction of viscous crude oil in actual oilfields, which is mainly because that water is often adopted as a working fluid for oil displacement in oilfields and many nanocatalysts have poor dispersibility in water in actual conditions, causing blockage in near-well zones. Although some nanocatalysts with good water solubility can be injected into the reservoir, they still fail to effectively perform viscosity reduction due to the difficulty in contacting the oil layer after entering the reservoir.

SUMMARY OF THE INVENTION

An object of the invention is to provide a supported catalyst-assisted microwave method for exploiting a viscous crude oil reservoir to overcome the defects in the prior art that the nano-catalytic systems will easily cause blockage, and fail to effectively reducing the viscosity in the actual exploitation due to the difficulty in contacting the oil layer. The invention comprehensively considers conditions of the viscous crude oil reservoirs to be exploited, properties of respective nano-catalytic systems, optimization of specific exploitation process and selection of subsequent displacement power, developing a high-quality and high-efficiency microwave method for, exploiting a viscous crude oil reservoir.

The technical solutions of the invention are described as follows.

Provided is a supported catalyst-assisted microwave method for exploiting a viscous crude oil reservoir, comprising:

(1) injecting a slug of a supported catalyst fluid into the viscous crude oil reservoir;

wherein the viscous crude oil reservoir has a single layer thickness of larger than or equal to 5 m, a net-gross thickness ratio of more than 0.5, a buried depth of 1000~3000 m, a reservoir porosity of 20~30%, a permeability of more than 1 mD and a reservoir pore throat diameter of larger than 1 μm;

the viscous crude oil reservoir, at a formation temperature, has a degassed oil viscosity of less than or equal to 20,000 mPa·s, an oil saturation of more than or equal to 40%, and a content of viscous crude components in viscous crude oil of 10~40%;

the supported catalyst fluid consists of 0.05~0.1% by weight of a supported catalyst and water;

the supported catalyst is magnetic graphene oxide nanoparticle; and the slug of the supported catalyst fluid has an injection amount of 0.05 PV~0.1 PV and an injection rate of less than or equal to 3 m/d (meters per day);

(2) placing a microwave generator in the viscous crude oil reservoir to perform volumetric heating on an oil layer containing the supported catalyst fluid; and (3) turning off the microwave generator and injecting water into the viscous crude oil reservoir for subsequent displacement;

wherein a water injection rate is 3 m/d or less.

In an embodiment, the magnetic graphene oxide nanoparticle is composed of graphene oxide and $Fe_3O_4$ nanoparticle loaded thereon.

In an embodiment, the $Fe_3O_4$ nanoparticle loaded on the magnetic graphene oxide nanoparticle is 20~40% by weight of the magnetic graphene oxide nanoparticle.

The graphene oxide has a particle size of 100 nm, and the $Fe_3O_4$ nanoparticle has a particle size of 20~100 nm.

In step (1), the injection rate of the slug of the supported catalyst fluid is 2 m/d~3 m/d.

In step (3), the water injection rate is 2 m/d~3 m/d.

A volume ratio of the injected water to supported catalyst fluid is 5:1 or more. The volume ratio of the injected water to supported catalyst fluid should not be too small, because that the main function of a catalyst slug is to modify and reduce the viscosity of viscous crude oil, and the subsequent water drive recovers the viscous crude oil after the viscosity reduction. Therefore the volume of the injected water is at least five times of the volume of the injected catalyst, and the injection should not be too fast. When the injection is too fast, a water breakthrough channel is generated easily, which affects the recovery ratio, so the injection should be slow to expand the swept volume.

A volume ratio of the injected water to the supported catalyst fluid is 5~10:1.

In step (2), the microwave generator has a microwave frequency of 2450 MHz and a power of 700 W.

In step (2), the volumetric heating is performed for 5~30 min.

Compared to the prior art, the invention has the following beneficial effects.

The invention first selects a viscous crude oil reservoir satisfying the requirements with respect to the single layer thickness, the net-gross thickness ratio, the buried depth and the reservoir porosity, to which a slug of the supported catalyst fluid is then injected. The supported catalyst is magnetic graphene oxide nanoparticle, which is capable of forming stable hydrocolloids due to the high hydrophilicity, and has good dispersibility in water, so that the fluid can be smoothly injected into the viscous crude oil reservoir, avoiding the occurrence of blockage in near-well zones. At the same time, when the reservoir is volumetrically heated under microwave radiation, changes occur to the performance of the support in the injected supported catalyst fluid, so that the supported catalyst can be carried from a water layer to an oil layer to achieve full contact with the oil layer. The catalyst is heated to the reaction temperature for the cracking of viscous crude components in the viscous crude oil under the microwave radiation, so that the catalyst can effectively catalyze the modification and viscosity reduction of the viscous crude oil in the oil layer, improving the driving efficiency of subsequent water for the viscous crude oil. Finally, the crude oil is extracted by water drive, where the subsequent water injection can compensate for the formation energy loss caused by the microwave oil extraction and displace the modified and viscosity-reduced crude oil, improving the recovery ratio.

The invention investigates the effect of the loading amount and particle size of the supported catalyst on the viscosity-reducing rate of the viscous crude oil and the effect of the relationship between the injection amount of the supported catalyst fluid and the injection amount of the subsequent water drive on the oil recovery, and further comprehensively considers conditions of the viscous crude oil reservoir to be exploited, properties of the nano-catalytic system, optimization of the specific exploitation process and selection of the subsequent displacement power, developing a high-quality and high-efficiency microwave method for exploiting the viscous crude oil reservoir.

DETAILED DESCRIPTION OF EMBODIMENTS

The invention will be described in detail with reference to the following embodiments.

Example 1

Figure 1:
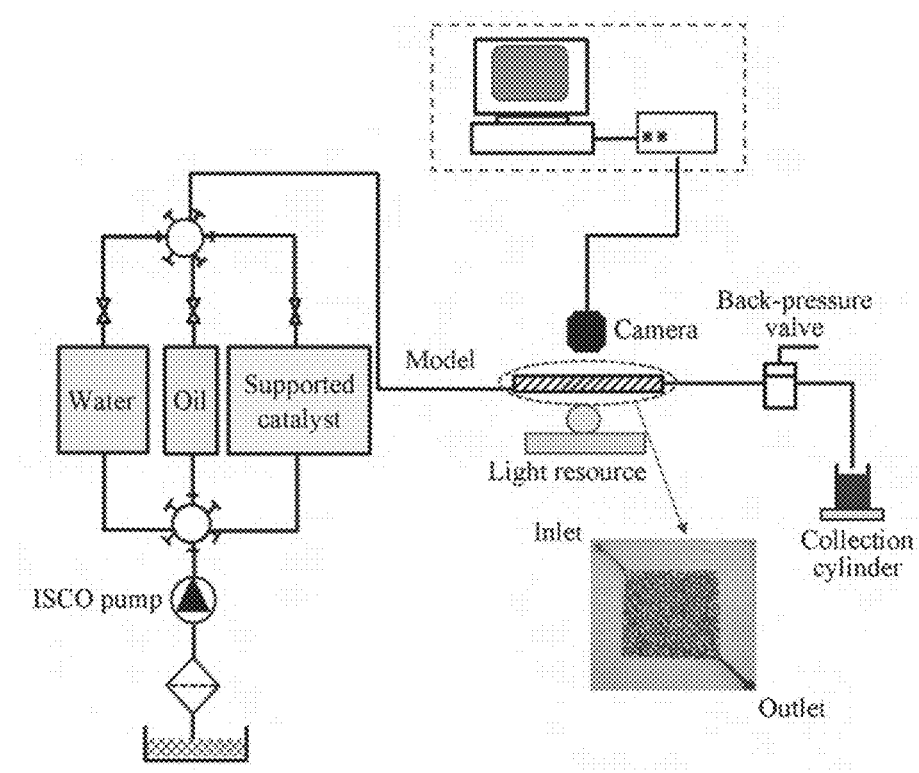
FIG. 1 schematically shows a micro displacement experiment and a micro glass model according to an embodiment of the invention.

Individual experimental devices were checked and connected according to FIG. 1 to establish a micro model, which was washed with ethanol and ultrapure water before the experiment. The experiment was carried out as follows.

(1) The micro model was vacuumized.

(2) The micro model in a holder was preheated by a heating jacket for 2 h, and a confining pressure of the micro model was set to 1 MPa.

(3) The micro model was sequentially saturated with water and experimental viscous crude oil.

(4) The micro model was injected with a supported catalyst fluid at an injection rate of 2.5 m/d, and then irradiated with microwave for 5 min.

(5) The micro model was subjected to subsequent water drive at an injection rate of 2.5 m/d.

(6) During the experiment, a microscopic digital camera system was employed for real-time recording of the displacement process.

To simulate a viscous crude oil reservoir, the micro model was prepared to have a width of 5 cm, a length of 5 cm, a pore throat diameter of 50 μm and an oil saturation of 95%. The experimental viscous crude oil had a viscosity of 80 mPa·s at 50° C. and a viscous crude component (colloid, asphaltene) content of 12%. The supported catalyst was magnetic graphene oxide nanoparticle, which was composed of graphene oxide with a particle size of 100 nm and $Fe_3O_4$ nanoparticle with a particle size of 20 nm loaded thereon. The $Fe_3O_4$ nanoparticle was 30% by weight of the magnetic graphene oxide nanoparticle. The supported catalyst fluid consisted of 0.05% by weight of the supported catalyst and water. An injection amount of the supported catalyst fluid slug was 0.1 PV, and an injection amount of water in the subsequent water drive was 0.5 PV.

Example 2

Individual experimental devices were checked and connected according to FIG. 1 to establish a micro model, which was washed with ethanol and ultrapure water before the experiment. The experiment was carried out as follows.

(1) The micro model was vacuumized.

(2) The micro model in a holder was preheated by a heating jacket for 2 h, and a confining pressure of the micro model was set to 1 MPa.

(3) The micro model was sequentially saturated with water and experimental viscous crude oil.

(4) The micro model was injected with a supported catalyst fluid at an injection rate of 2.5 m/d, and then irradiated with microwave for 5 min.

(5) The micro model was subjected to subsequent water drive at an injection rate of 2.5 m/d.

(6) During the experiment, a microscopic digital camera system was employed for real-time recording of the displacement process.

To simulate a viscous crude oil reservoir, the micro model was prepared to have a width of 5 cm, a length of 5 cm, a pore throat diameter of 50 μm and an oil saturation of 95%. The experimental viscous crude oil had a viscosity of 80 mPa·s at 50° C. and a viscous crude component (colloid, asphaltene) content of 12%. The supported catalyst was magnetic graphene oxide nanoparticle, which was composed of graphene oxide with a particle size of 100 nm and $Fe_3O_4$ nanoparticle with a particle size of 20 nm loaded thereon. The $Fe_3O_4$ nanoparticle was 30% by weight of the magnetic graphene oxide nanoparticle. The supported catalyst fluid consisted of 0.05% by weight of the supported catalyst and water. An injection amount of the supported catalyst fluid slug was 0.1 PV, and an injection amount of water in the subsequent water drive was 1 PV.

Example 3

Individual experimental devices were checked and connected according to FIG. 1 to establish a micro model, which was washed with ethanol and ultrapure water before the experiment. The experiment was carried out as follows.
(1) The micro model was vacuumized.
(2) The micro model in a holder was preheated by a heating jacket for 2 h, and a confining pressure of the micro model was set to 1 MPa.
(3) The micro model was sequentially saturated with water and experimental viscous crude oil.
(4) The micro model was injected with a supported catalyst fluid at an injection rate of 2.5 m/d, and then irradiated with microwave for 5 min.
(5) The micro model was subjected to subsequent water drive at an injection rate of 2.5 m/d.
(6) During the experiment, a microscopic digital camera system was employed for real-time recording of the displacement process.

To simulate a viscous crude oil reservoir, the micro model was prepared to have a width of 5 cm, a length of 5 cm, a pore throat diameter of 50 μm and an oil saturation of 95%. The experimental viscous crude oil had a viscosity of 80 mPa·s at 50° C. and a viscous crude component (colloid, asphaltene) content of 12%. The supported catalyst was magnetic graphene oxide nanoparticle, which was composed of graphene oxide with a particle size of 100 nm and $Fe_3O_4$ nanoparticle with a particle size of 20 nm loaded thereon. The $Fe_3O_4$ nanoparticle was 30% by weight of the magnetic graphene oxide nanoparticle. The supported catalyst fluid consisted of 0.1% by weight of the supported catalyst and water. An injection amount of the supported catalyst fluid slug was 0.1 PV, and an injection amount of water in the subsequent water drive was 0.5 PV.

Example 4

Individual experimental devices were checked and connected according to FIG. 1 to establish a micro model, which was washed with ethanol and ultrapure water before the experiment. The experiment was carried out as follows.
(1) The micro model was vacuumized.
(2) The micro model in a holder was preheated by a heating jacket for 2 h, and a confining pressure of the micro model was set to 1 MPa.
(3) The micro model was sequentially saturated with water and experimental viscous crude oil.
(4) The micro model was injected with a supported catalyst fluid at an injection rate of 2.5 m/d, and then irradiated with microwave for 5 min.
(5) The micro model was subjected to subsequent water drive at an injection rate of 2.5 m/d.
(6) During the experiment, a microscopic digital camera system was employed for real-time recording of the displacement process.

To simulate a viscous crude oil reservoir, the micro model was prepared to have a width of 5 cm, a length of 5 cm, a pore throat diameter of 50 μm and an oil saturation of 95%. The experimental viscous crude oil had a viscosity of 80 mPa·s at 50° C. and a viscous crude component (colloid, asphaltene) content of 12%. The supported catalyst was magnetic graphene oxide nanoparticle, which was composed of graphene oxide with a particle size of 100 nm and $Fe_3O_4$ nanoparticle with a particle size of 20 nm loaded thereon. The $Fe_3O_4$ nanoparticle was 30% by weight of the magnetic graphene oxide nanoparticle. The supported catalyst fluid consisted of 0.1% by weight of the supported catalyst and water. An injection amount of the supported catalyst fluid slug was 0.5 PV, and an injection amount of water in the subsequent water drive was 1 PV.

Figure 2:
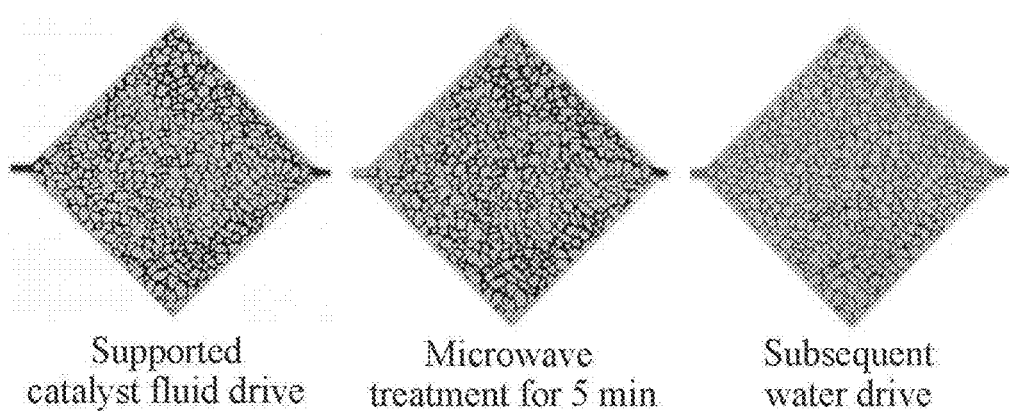
FIG. 2 schematically shows the process of an experiment according to Example 4 of the invention.
Figure 3:
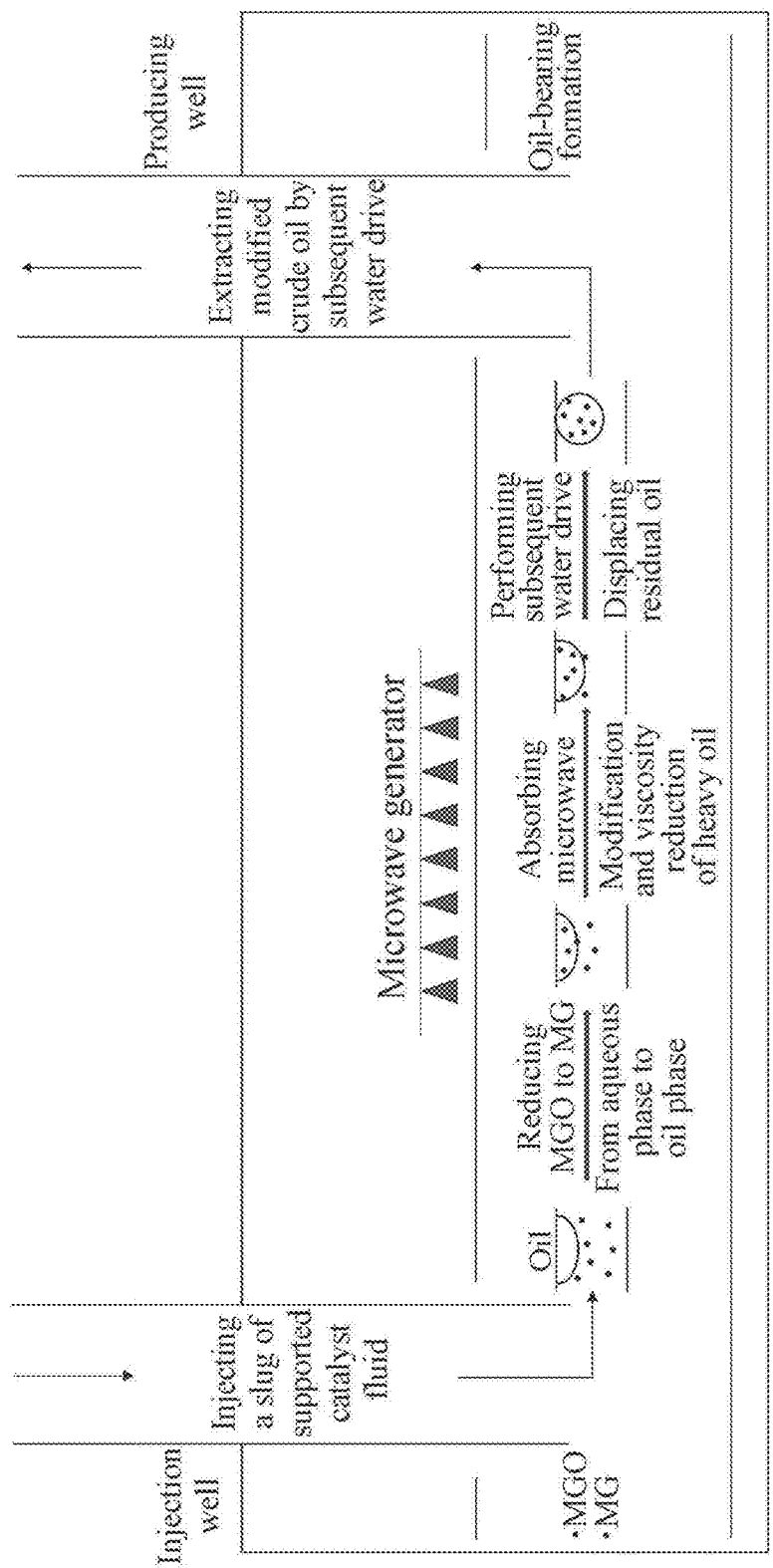
FIG. 3 schematically shows the exploitation of a viscous crude oil reservoir using a supported catalyst assisted-microwave method according to an embodiment of the invention, where the supported catalyst is hydrophilic magnetic graphene oxide (MGO), which can be reduced to lipophilic magnetic graphene (MG) through the microwave radiation.

In FIG. 2, the black lines represent the viscous crude oil, and the blue lines represent the dyed displacement fluid. It can be concluded from FIG. 2 that most of the remaining oil was still not extracted after the supported catalyst fluid drive. After the microwave heating treatment for 5 min, some oil and water re-transported, and the subsequent water drive provided sufficient power to extract most of the remaining viscosity-reduced oil.

Comparative Example 1

Individual experimental devices were checked and connected according to FIG. 1 to establish a micro model. The model was washed with ethanol and ultrapure water before the experiment began. The experiment was carried out as follows.
(1) The micro model was vacuumized.
(2) The micro model in a holder was preheated by a heating jacket for 2 h, and a confining pressure of the micro model was set to 1 MPa.
(3) The micro model was sequentially saturated with water and experimental viscous crude oil.
(4) The micro model was subjected to subsequent water drive at an injection rate of 2.5 m/d.
(5) During the experiment, a microscopic digital camera system was employed for real-time recording of the displacement process.

To simulate a viscous crude oil reservoir, the model was prepared to have a width of 5 cm, a length of 5 cm, a pore throat diameter of 50 μm and an oil saturation of 95%. The experimental viscous crude oil had a viscosity of 80 mPa·s at 50° C. and a viscous crude component (colloid, asphaltene) content of 12%. An injection amount of water in the subsequent water drive was 0.5 PV.

Comparative Example 2

Experimental devices were checked and connected to establish a model according to FIG. 1. The model was washed with ethanol and ultrapure water before the experiment began. The experiment was carried out as follows.
(1) The micro model was vacuumized.
(2) The micro model in a holder was preheated by a heating jacket for 2 h, and a confining pressure of the micro model was set to 1 MPa.
(3) The micro model was sequentially saturated with water and experimental viscous crude oil.

(4) The micro model was subjected to subsequent water drive at an injection rate of 2.5 m/d.

(5) During the experiment, a microscopic digital camera system was employed for real-time recording of the displacement process.

To simulate a viscous crude oil reservoir, the model was prepared to have a width of 5 cm, a length of 5 cm, a pore throat diameter of 50 μm and an oil saturation of 95%. The experimental viscous crude oil had a viscosity of 80 mPa·s at 50° C. and a viscous crude component (colloid, asphaltene) content of 12%. An injection amount of water in the subsequent water drive was 1 PV.

Comparative Example 3

Experimental devices were checked and connected to establish a model according to FIG. 1. The model was washed with ethanol and ultrapure water before the experiment began. The experiment was carried out as follows.

(1) The micro model was vacuumized.

(2) The micro model in a holder was preheated by a heating jacket for 2 h, and a confining pressure of the micro model was set to 1 MPa.

(3) The micro model was sequentially saturated with water and experimental viscous crude oil.

(4) The micro model was injected with a supported catalyst fluid at an injection rate of 2.5 m/d, and then irradiated with microwave for 5 min.

(5) The micro model was subjected to subsequent water drive at an injection rate of 2.5 m/d.

(6) During the experiment, a microscopic digital camera system was employed for real-time recording of the displacement process.

To simulate a viscous crude oil reservoir, the micro model was prepared to have a width of 5 cm, a length of 5 cm, a pore throat diameter of 50 μm and an oil saturation of 95%. The experimental viscous crude oil had a viscosity of 80 mPa·s at 50° C. and a viscous crude component (colloid, asphaltene) content of 12%. The supported catalyst was magnetic graphene oxide nanoparticle, which was composed of graphene oxide with a particle size of 100 nm and $Fe_3O_4$ nanoparticle with a particle size of 20 nm loaded thereon. The $Fe_3O_4$ nanoparticle was 30% by weight of the magnetic graphene oxide nanoparticle. The supported catalyst fluid consisted of 0.05% by weight of the supported catalyst and water. An injection amount of the supported catalyst fluid slug was 0.1 PV, and an injection amount of water in the subsequent water drive was 0.5 PV.

The recovery ratios obtained in Examples 1-4 and Comparative Examples 1-3 were shown in Table 1. It can be concluded from Table 1 that in the case of the same injection parameters, the introduction of microwave treatment can lead to an increase of 21% in the recovery ratio; the injection of 0.1 PV of the supported catalyst fluid (containing 0.05% by weight of the supported catalyst) boosted the recovery ratio by 4%; and the combined use of the supported catalyst fluid and the microwave treatment increased the recovery ratio by at least 25% compared to the single use of the subsequent water drive. In addition, the recovery ratio was positively correlated with the injection amount of the supported catalyst fluid and the mass fraction of the supported catalyst.

Experimental Example 1

A viscous crude oil, having a viscosity of 83,400 mPa·s at 50° C., was added with 2 wt % of hydrogen donor and divided into seven parts which were exactly the same and respectively numbered. The seven parts of the viscous crude oil were treated as follows. Part 1 was free of any additives; Part 2 was added with 1 wt % of $Fe_3O_4$ nanoparticle with a particle size of 5.5 nm; Part 3 was added with 1 wt % of $Fe_3O_4$ nanoparticle with a particle size of 20 nm; Part 4 was added with 1 wt % of $Fe_3O_4$ nanoparticle with a particle size of 50 nm; Part 5 was added with 1 wt % of $Fe_3O_4$ nanoparticle with a particle size of 100 nm; Part 6 was added with 1 wt % of $Fe_3O_4$ nanoparticle with a particle size of 1000 nm; and Part 7 was added with 1 wt % of $Fe_3O_4$ nanoparticle with a particle size of 10,000 nm. The seven parts of the viscous crude oil were heated under the microwave irradiation at a frequency of 2450 MHz and a power of 700 W for 30 min. After cooled to room temperature, the seven parts of the viscous crude oil were measured for viscosity, and the viscosity at 50° C. was used as the initial viscosity in the calculation of a viscosity-reducing rate, where the viscosity-reducing rate referred to a percentage of the viscous crude oil viscosity reduced after the catalyst was added. Viscosity-reducing rates of viscous crude oil at 50° C. corresponding to $Fe_3O_4$ nanoparticles of different particle sizes were shown in Table 2.

TABLE 1

Parameters and recovery ratios of Examples 1-4 and Comparative Examples 1-3

| No. | Mass fraction of the supported catalyst, % | Injection amount of the supported catalyst fluid, PV | Microwave treatment | Injection amount of water for the subsequent water drive, PV | Recovery ratio, % |
|---|---|---|---|---|---|
| Example 1 | 0.05 | 0.1 | Yes | 0.5 | 66.5 |
| Example 2 | 0.05 | 0.1 | Yes | 1 | 69.4 |
| Example 3 | 0.1 | 0.1 | Yes | 0.5 | 79.4 |
| Example 4 | 0.1 | 0.5 | Yes | 1 | 87.6 |
| Comparative Example 1 | — | — | No | 0.5 | 41.5 |
| Comparative Example 2 | — | — | No | 1 | 50.8 |
| Comparative Example 3 | 0.05 | 0.1 | No | 0.5 | 45.5 |

TABLE 2

Viscosity-reducing rates at 50° C. corresponding to Fe₃O₄ nanoparticles of different particle sizes

| No. | 1 | 2 | 3 | 4 | 5 | 6 | 7 |
|---|---|---|---|---|---|---|---|
| Particle size of $Fe_3O_4$ nanoparticle(nm) | — | 5.5 | 20 | 50 | 100 | 1000 | 10,000 |
| Viscosity(mPa·s) | 70,200 | 56,600 | 41,400 | 40,000 | 40,200 | 50,200 | 57,900 |
| Viscosity-reducing rate(%) | 15.83 | 32.13 | 50.36 | 52.04 | 51.80 | 39.81 | 30.58 |

Figure 4:
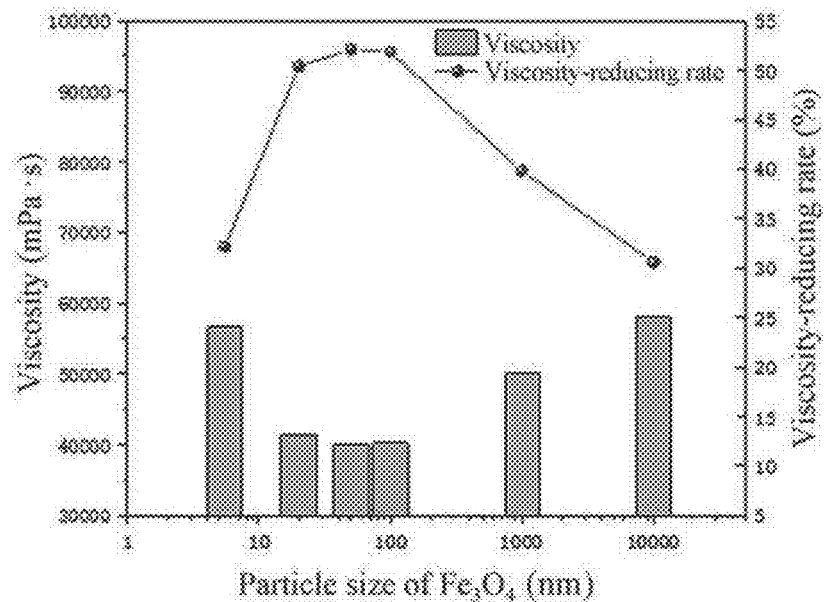
FIG. 4 shows the relationship between particle size of $Fe_3O_4$ nanoparticle and viscosity-reducing rate of the viscous crude oil under 50° C. according to Experimental example 1 of the invention.

It can be seen from Table 2 and FIG. 4 that Parts 3, 4 and 5 which were respectively added with $Fe_3O_4$ nanoparticle having a particle size of 20 nm-100 nm all had a viscosity-reducing rate of 50% or more, while Parts 6 and 7 respectively added with a $Fe_3O_4$ micro-particle only had a viscosity-reducing rate of 30%-40%. Therefore, nano catalysts worked better within a certain range. Specifically, in the range, due to a larger surface area, better dispersion in the viscous crude oil, higher conversion efficiency for microwaves and certain volume effect, the nano catalysts were greatly enhanced in the magnetic property and catalytic activity, significantly promoting the catalytic efficiency. Moreover, the experimental results also proved that undersized $Fe_3O_4$ nanoparticle, such as Part 1, had a general viscosity-reducing effect, which was mainly because that the undersized particles were prone to serious agglomeration to form a larger particle, losing the unique physicochemical property. Given the above, the $Fe_3O_4$ nanoparticle preferably had a particle size of 20-100 nm.

Experimental Example 2

A viscous crude oil, having a viscosity of 92,000 mPa·s at 50° C., was added with 2 wt % of hydrogen donor and divided into six parts which were exactly the same and respectively numbered. The six parts of the viscous crude oil were treated as follows. Part 1 was added with 1 wt % magnetic graphene oxide with a loading amount of 0%; Part 2 was added with 1 wt % magnetic graphene oxide with a loading amount of 10%; Part 3 was added with 1 wt % magnetic graphene oxide with a loading amount of 20%; Part 4 was added with 1 wt % magnetic graphene oxide with a loading amount of 30%; Part 5 was added with 1 wt % magnetic graphene oxide with a loading amount of 40%; Part 6 was added with 1 wt % magnetic graphene oxide with a loading amount of 50%. The six parts of the viscous crude oil were heated under the microwave irradiation at a frequency of 2450 MHz and a power of 700 W for 30 min. After cooled to room temperature, the six parts of the viscous crude oil were measured for viscosity, and the viscosity at 50° C. was used as the initial viscosity in the calculation of a viscosity-reducing rate, where the viscosity-reducing rate referred to a percentage of the viscous crude oil viscosity reduced after the catalyst was added. The supported $Fe_3O_4$ nanoparticle had a same particle size of 20 nm. Viscosity-reducing rates of viscous crude oil at 50° C. corresponding to different loading amounts of $Fe_3O_4$ nanoparticle were shown in Table 3.

TABLE 3

Viscosity-reducing rates at 50° C. corresponding to different loading amounts of $Fe_3O_4$ nanoparticle

| No. | 1 | 2 | 3 | 4 | 5 | 6 |
|---|---|---|---|---|---|---|
| Loading amount % | 0 | 10 | 20 | 30 | 40 | 50 |
| Viscosity(mPa·s) | 75,900 | 59,600 | 55,000 | 50,100 | 47,300 | 45,200 |
| Viscosity-reducing rate(%) | 17.5 | 35.22 | 40.22 | 45.54 | 48.59 | 50.87 |

Figure 5:
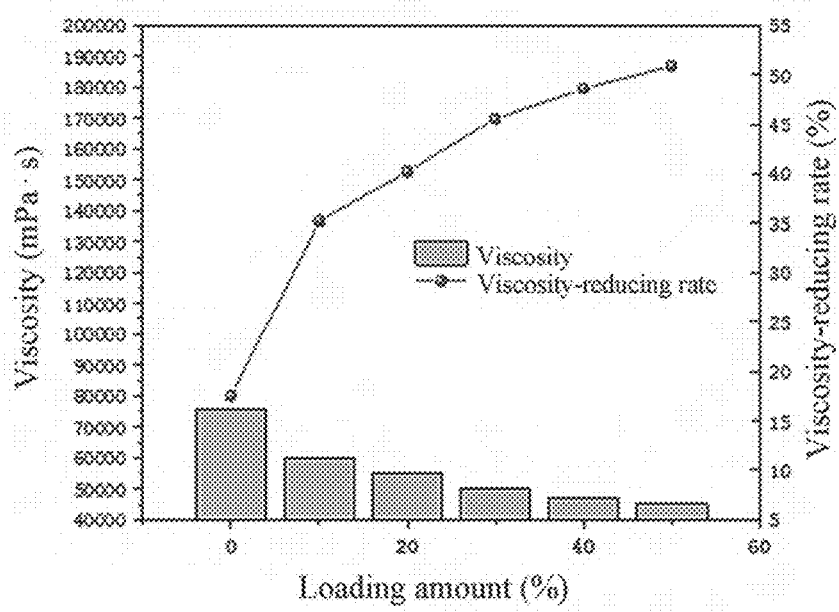
FIG. 5 shows the relationship between loading amount of $Fe_3O_4$ nanoparticle and viscosity-reducing rate of the viscous crude oil under 50° C. according to Experimental example 2 of the invention.

It can be seen from Table 3 and FIG. 5 that the viscosity-reducing rate was gradually increased with the increase in the loading amount of the $Fe_3O_4$ nanoparticle, but the increasing speed was gradually reduced, which was because that an excessive loading amount will result in the agglomeration of the supported catalyst, reducing the dispersibility in water. Therefore, a loading amount of the $Fe_3O_4$ nanoparticle was preferably 20%-40%.

Experimental Example 3

A viscous crude oil, having a viscosity of 88,600 mPa·s at 50° C., was added with 2 wt % of hydrogen donor and 1 wt % magnetic graphene oxide, and divided into four parts which were exactly the same and respectively numbered. The four parts of the viscous crude oil were treated as follows. The four parts of the viscous crude oil were heated under the microwave irradiation at a frequency of 2450 MHz and different powers of 385 W, 539 W, 700 W and 850 W for 30 min. After cooled to room temperature, the four parts of the viscous crude oil were measured for viscosity, and the viscosity at 50° C. was used as the initial viscosity in the calculation of a viscosity-reducing rate, where the viscosity-reducing rate referred to a percentage of the viscous crude oil viscosity reduced after the catalyst was added. Viscosity-reducing rates of viscous crude oil at 50° C. corresponding to different microwave powers were shown in Table 4.

TABLE 4

Viscosity-reducing rates at 50° C. corresponding to different microwave powers

| No. | 1 | 2 | 3 | 4 |
|---|---|---|---|---|
| Microwave power(W) | 385 | 539 | 700 | 850 |
| Viscosity(mPa·s) | 64,800 | 53,600 | 50,200 | 48,400 |
| Viscosity-reducing rate(%) | 26.86 | 39.50 | 43.34 | 45.37 |

Figure 6:
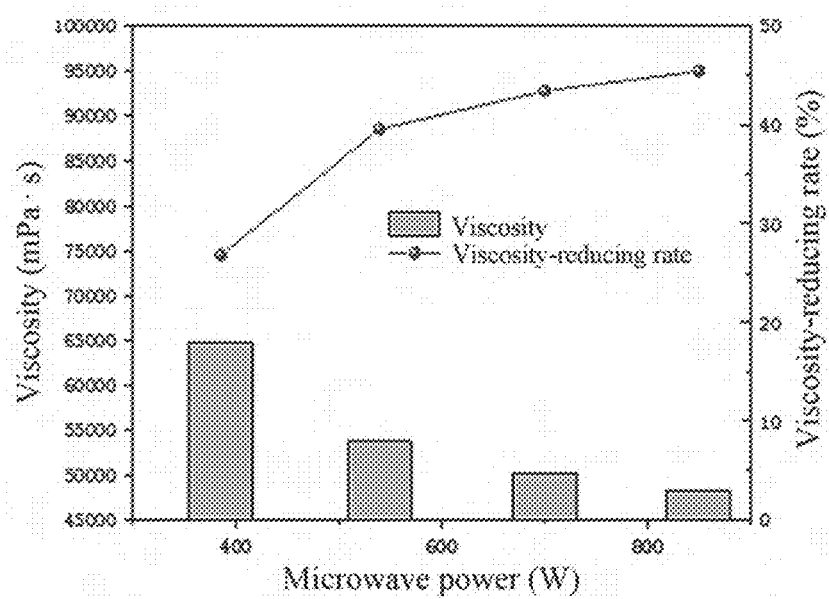
FIG. 6 shows the relationship between microwave power and viscosity-reducing rate of the viscous crude oil under 50° C. according to Experimental example 3 of the invention.

It can be seen from Table 4 and FIG. 6 that the viscosity-reducing rate was gradually increased as the microwave power increased, but the increasing speed was gradually reduced. However, excessive microwave power will bring a series of safety problems and loss in the economic benefits.

Experimental Example 4

A viscous crude oil, having a viscosity of 88,600 mPa·s at 50° C., was added with 2 wt % of hydrogen donor and 1 wt % magnetic graphene oxide, and divided into four parts which were exactly the same and respectively numbered. The four parts of the viscous crude oil were treated as follows. The four parts of the viscous crude oil were heated under the microwave irradiation at a frequency of 2450 MHz and a power of 700 W for 5 min, 10 min, 20 min and 30 min, respectively. After cooled to room temperature, the four parts of the viscous crude oil were measured for viscosity, and the viscosity at 50° C. was used as the initial viscosity in the calculation of a viscosity-reducing rate, where the viscosity-reducing rate referred to a percentage of the viscous crude oil viscosity reduced after the catalyst was added. Viscosity-reducing rates of viscous crude oil at 50° C. corresponding to different microwave heating times were shown in Table 5.

TABLE 5

Viscosity-reducing rates at 50° C. corresponding to different microwave heating times

| No. | 1 | 2 | 3 | 4 |
|---|---|---|---|---|
| Microwave heating time(min) | 5 | 10 | 20 | 30 |
| Viscosity(mPa · s) | 70,300 | 52,600 | 50,200 | 50,600 |
| Viscosity-reducing rate(%) | 20.65 | 40.63 | 43.34 | 42.89 |

Figure 7:
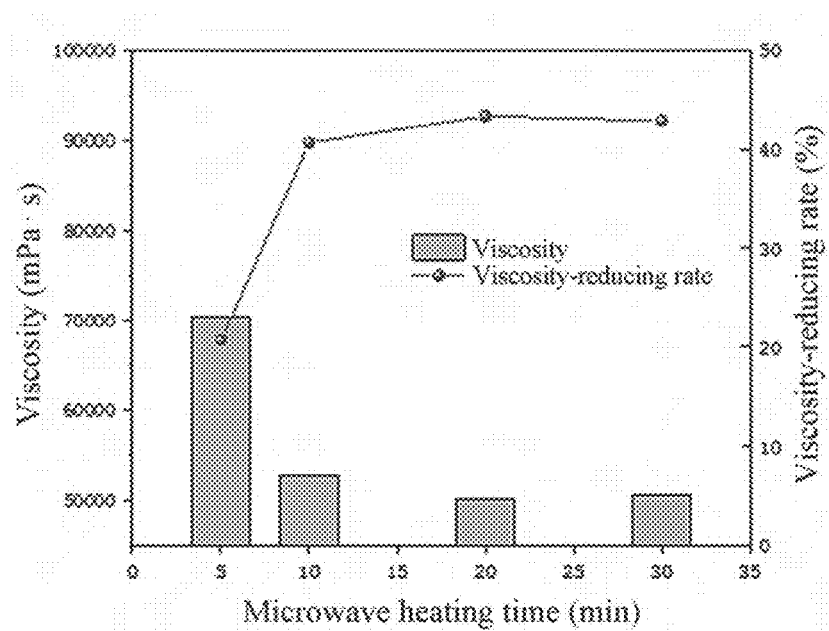
FIG. 7 shows the relationship between microwave heating time and viscosity-reducing rate of the viscous crude oil under 50° C. according to Experimental example 4 of the invention.

It can be seen from Table 5 and FIG. 7 that with the extension of the microwave heating time, the viscosity-reducing rate was gradually increased, but the growth was gradually slowed down. Moreover, excessive microwave heating may give rise to a series of safety problems and loss in the economic benefits.

What is claimed is:

1. A supported catalyst-assisted microwave method for exploiting a viscous crude oil reservoir, comprising:
   (1) injecting a slug of a supported catalyst fluid into the viscous crude oil reservoir at 0.05~0.1 Pore Volume (PV) and an injection rate of the slug of the supported catalyst fluid of less than or equal to 3 meters/day;
   wherein the viscous crude oil reservoir has a single layer thickness of larger than or equal to 5 m, a net-gross thickness ratio of more than 0.5, a buried depth of 1000~3000 m, a reservoir porosity of 20~30%, a permeability of more than 1 mD and a reservoir pore throat diameter of larger than 1 μm;
   the viscous crude oil reservoir at a formation temperature has a degassed oil viscosity of less than or equal to 20,000 mPa·s, an oil saturation of more than or equal to 40%, and a content of viscous crude components in viscous crude oil of 10~40%;
   the supported catalyst fluid consists of 0.05~0.1% by weight of a supported catalyst, and water; and
   the supported catalyst is magnetic graphene oxide nanoparticle;
   (2) placing a microwave generator in the viscous crude oil reservoir to perform volumetric heating on an oil layer containing the supported catalyst fluid; and
   (3) turning off the microwave generator and injecting water into the viscous crude oil reservoir for subsequent displacement, wherein a water injection rate is 3 meters/day or less;
   the magnetic graphene oxide nanoparticle is composed of graphene oxide and Fe3O4 nanoparticle loaded thereon.

2. The method of claim 1, wherein the Fe3O4 nanoparticle loaded on the magnetic graphene oxide nanoparticle is 20~40% by weight of the magnetic graphene oxide nanoparticle.

3. The method of claim 1, wherein the graphene oxide has a particle size of 100 nm, and the Fe3O4 nanoparticle has a particle size of 20~100 nm.

4. The method of claim 1, wherein in step (1), the injection rate of the slug of the supported catalyst fluid is 2~3 meters/day.

5. The method of claim 1, wherein in step (3), the water injection rate is 2~3 meters/day.

6. The method of claim 1, wherein a volume ratio of an injected water to the supported catalyst fluid is 5~10:1.

7. The method of claim 1, wherein in step (2), the microwave generator has a microwave frequency of 2450 MHz and a power of 700 W.

8. The method of claim 1, wherein in step (2), the volumetric heating is performed for 5~30 min.

* * * * *